(12) United States Patent
Hwang

(10) Patent No.: US 6,883,541 B2
(45) Date of Patent: Apr. 26, 2005

(54) MANUAL-AUTOMATIC WATER FAUCET (75) Inventor: Su Hwang, Nan-Tou (TW)

(73) Assignee: Hydrotek Corporation, Nan-Tou (TW)

( * ) Notice: Subject to any disclaimer, the term of this patent is extended or adjusted under 35 U.S.C. 154(b) by 218 days.

(21) Appl. No.: 10/394,043

(22) Filed: Mar. 24, 2003

(65) Prior Publication Data
US 2004/0187934 A1 Sep. 30, 2004

(51) Int. Cl.$^7$ .......................... F16K 11/18; F16K 11/24
(52) U.S. Cl. ............... 137/599.08; 137/607; 137/637.4; 137/637.5; 251/26; 251/30.02; 251/129.04
(58) Field of Search .................. 137/599.08, 601.14, 137/607, 637.4, 637.5; 251/26, 129.04, 30.02

(56) References Cited

U.S. PATENT DOCUMENTS 2,983,279 A * 5/1961 Biermann ................ 137/637.4
4,709,728 A * 12/1987 Ying-Chung ............. 137/636.4
5,050,641 A * 9/1991 Shwu-Fen .................. 137/607

* cited by examiner

Primary Examiner—Stephen M. Hepperle
(74) Attorney, Agent, or Firm—Troxell Law Office PLLC (57) ABSTRACT A manual-automatic water faucet includes a shell installed inside with a water intake base, a water outlet valve, an electromagnetic valve, an induction device and a control device. The control device is composed of a valve rod, a spindle and a revolving button. The revolving button is able to actuate the valve rod to rotate or actuate the spindle to shift axially. When the valve rod is actuated to rotate, it can control water temperature, and when the spindle is actuated to shift axially, it can control the faucet to supply water automatically or manually.

3 Claims, 6 Drawing Sheets

MANUAL-AUTOMATIC WATER FAUCET

BACKGROUND OF THE INVENTION

1. Field of the Invention

This invention relates to a water faucet, particularly to one able to be operated manually and automatically.

2. Description of the Prior Art

In order to meet demands of sanitation and water saving, an inductive automatic water faucet has gradually become popular. The inductive automatic water faucet-controlled by electric power is convenient in use and conforms to environmental protection, but when power outage should happen or when power is used up, it cannot function any more. Besides, the time of water supply of such an automatic water faucet is preset, so it cannot continuously supply water to meet a user's needs. In view of the above-mentioned defects, a manually and automatically controlled water faucet has been researched and developed, but if this kind of double function is applied to a faucet which is able to control the flow of cold and hot water, it will be difficult to combine their complicated switches or handles together, resulting in trouble in use and increasing producing cost.

SUMMARY OF THE INVENTION

The objective of this invention is to offer a manual-automatic water faucet operated by a single component, which can not only regulate the flow of cold and hot water, but also control the manual-automatic changeover, simple in handling and simplifying components.

A manual-automatic water faucet in the present invention includes a shell having its lower portion formed with a neck extending forward and upward to make up a head, the neck having an opening forward at the bottom, and the head having a water supply opening formed beneath its upper end. A water intake base has its lower portion formed with a water-introducing portion provided inside with a cold and a hot water passage, and a water-intercepting portion is positioned on the water-introducing portion. The water interception portion has a horizontal main through hole communicating with the cold and the hot water passage, and the main through hole has its rear side formed with a coaxial subordinate through hole having a comparatively small diameter, with a water intake passage and a water outlet passage formed vertically at the upper side of the subordinate through hole. A water outlet valve positioned on the water intake base has a valve base and a valve plug provided inside. The valve base communicating with the cold and the hot water passage of the water intake base is formed at the bottom with a water-releasing hole blocked by the valve plug. The valve base has a pressure-releasing chamber formed above the valve plug, and the pressure-releasing chamber is connected with a first water exhausting passage and a second water exhausting passage. The first water exhausting passage has its other end communicating with the water-releasing hole, while the second water exhausting passage has its other end communicating with the water intake passage of the water intake base. The water outlet valve is further provided with a main water outlet communicating with the water outlet passage of the water intake base and the water-releasing hole. A water duct has one end communicating with the main water outlet and the other end extending to the water supply opening of the shell to guide cold and hot water to flow out of the water supply opening. An electromagnetic valve is positioned above the first water exhausting passage of the pressure-releasing chamber to control the first water exhausting passage to open and close. An induction device connected electrically with the electromagnetic valve has an electric eye exposed outward at the front end of the head of the shell to control the electromagnetic valve to operate by its photoelectric induction, and then the electromagnetic valve controls the first whatever exhausting passage to open and close. A control device is composed of a valve rod, a spindle and a revolving button. The valve rod positioned in the main through hole of the water intake base has two arc-shaped grooves bored diametrically at locations corresponding to the cold and the hot water passage of the water intake base to control the open extent of the cold and the hot water passage by turning the valve rod for various angles. The spindle is pivotally fitted in the valve rod to move axially therein, having an extending portion conforming to the size of the subordinate through hole of the water intake base. The extending portion of the spindle is provided with an annular groove of a preset width, so that when the spindle is axially moved to let the annular groove becoming positioned between the water intake passage and the water outlet passage, these two water passage will communicate with each other, and otherwise they are blocked from each other. Besides, the spindle has its outer end fixed with the revolving button, which has its other end protruding out of the shell for actuating the valve rod to rotate or actuating the spindle to shift axially. Thus, when the revolving button actuates the valve rod to rotate, the valve rod can control the water flow of the cold and the hot water passage, and when the revolving button actuates the spindle to shift axially, the spindle can control the water faucet to supply water manually or automatically.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
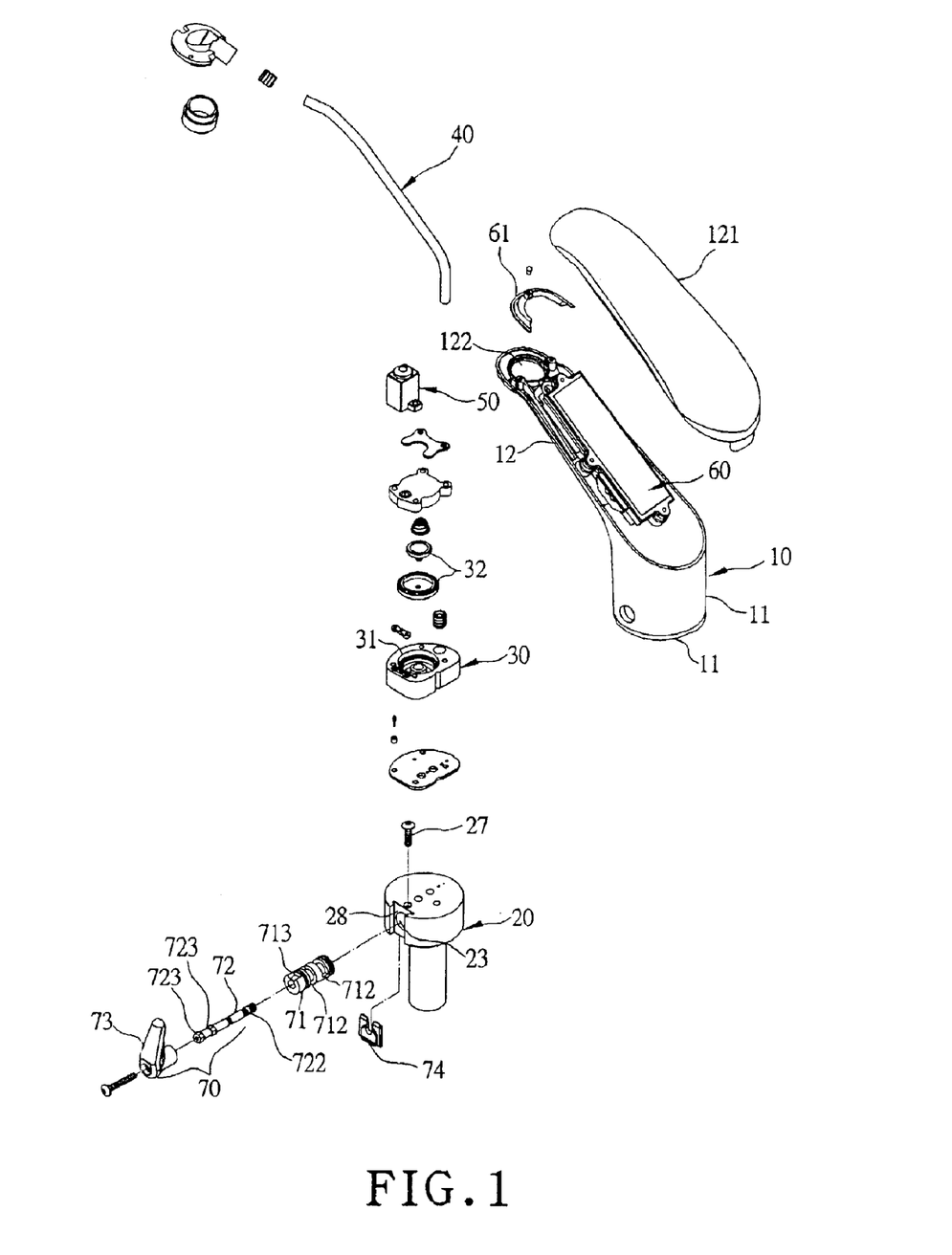
FIG. 1 is an exploded perspective view of a manual-automatic water faucet in the present invention.
Figure 2:
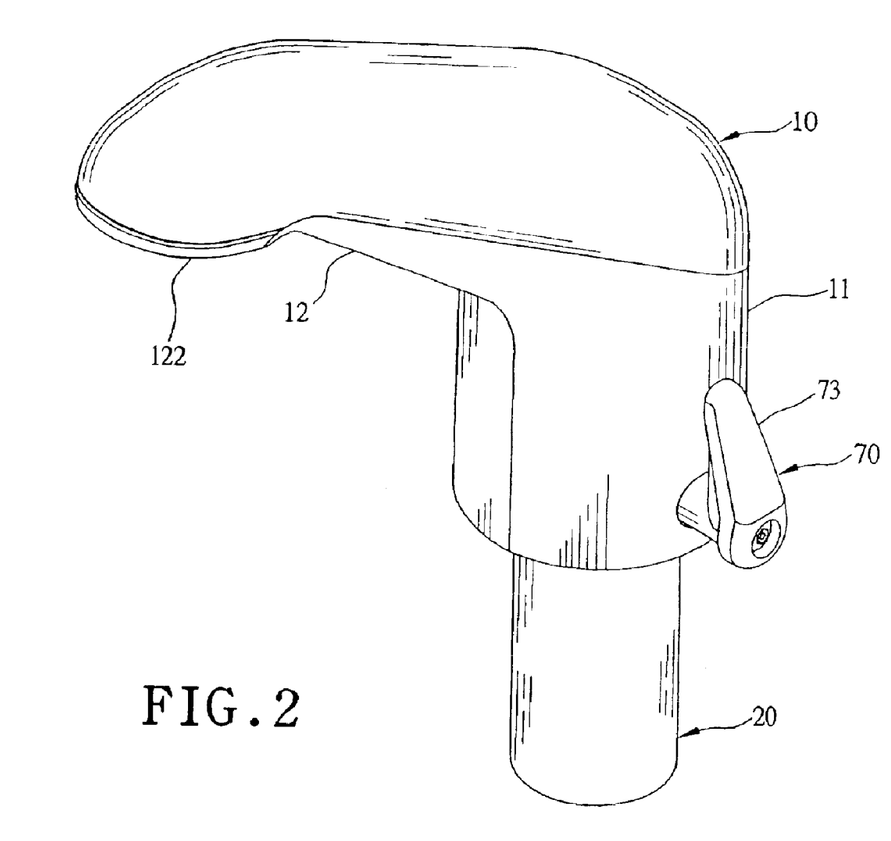
FIG. 2 is a perspective view of the manual-automatic water faucet in the present invention.
Figure 3:
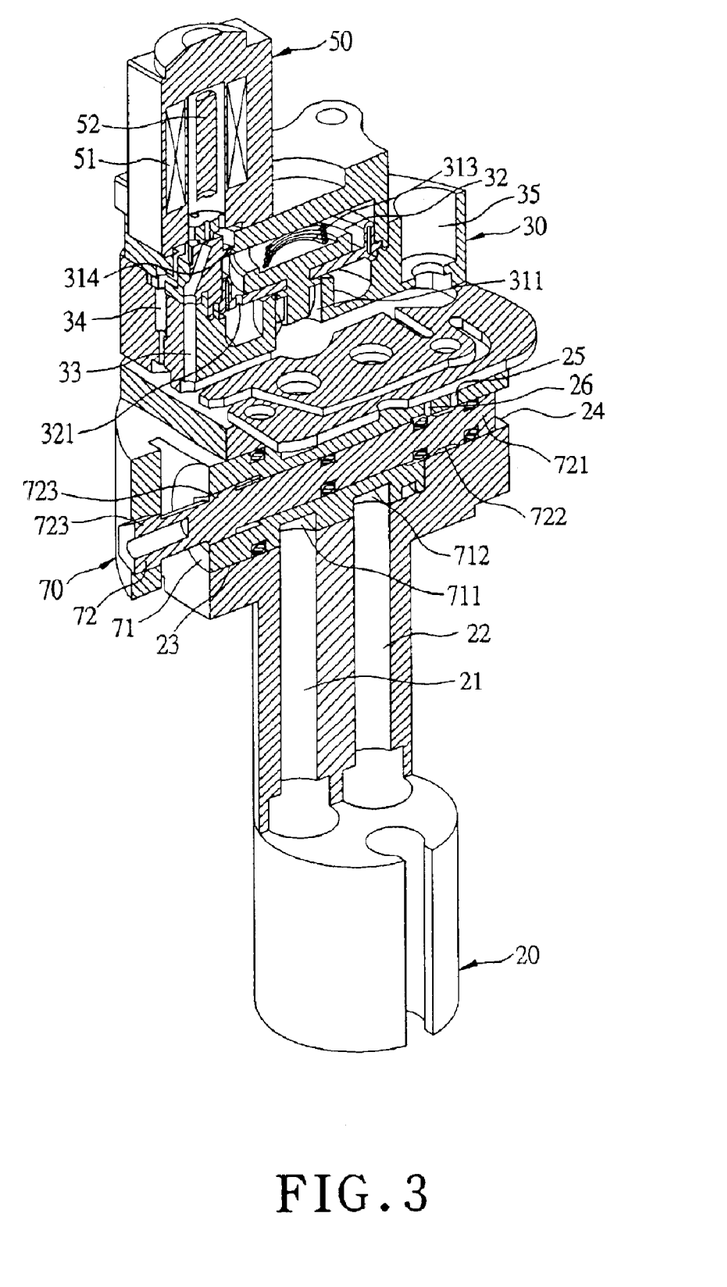
FIG. 3 is a cross-sectional view of the manual-automatic water faucet in the present invention.

A preferred embodiment of a manual-automatic water faucet in the present invention, as shown in FIGS. 1, 2 and 3, includes a shell 10, a water intake base 20, a water outlet valve 30, a water duct 40, an electromagnetic valve 50, an induction device 60 and a control device 70 as main components combined together.

The shell 10 with a hollow interior has its lower portion formed with a neck 11 to be fixedly assembled on a washbasin. The neck 11 extends forward and upward to form a head 12 having an upper cover 121. Further, the neck 11 has an opening 111 formed at the bottom, and the head 12 has a water supply opening 122 bored beneath its upper end.

The water intake base 20 to be positioned in the neck 11 of the shell 10 is provided vertically with a cold water passage 21 and a hot water passage 22 having their lower ends extending downward from the opening 111 of the shell 10 to be respectively connected with a cold and a hot water duct. Besides, the water intake base 20 has its upper portion bored with a horizontal main through hole 23 communicating with the cold and the hot water passage 21, 22. The main through hole 23 has its rear side formed with a coaxial subordinate through hole 24 having a comparatively small diameter, and the subordinate through hole 24 has a water intake passage 25 and a water outlet passage 26 provided vertically and respectively at a location of unequal diameter. Besides, the water intake base 20 has a bolt 27 vertically inserted in the main through hole 23 through an upper side near the outer edge, and a dove tail-shaped groove 28 formed at the outer side of the main through hole 23.

The water outlet valve 30 to be positioned on the water intake base 20 is provided inside with a valve base 31 and a valve plug 32. The valve base 31 communicates with the cold and the hot water passage 21, 22 of the water intake base 20, having a water-releasing hole 311 blocked by the valve plug 32. The valve plug 32 is formed with a pressure-leading hole 321, and the valve base 31 is formed above the valve plug 32 with a pressure-releasing chamber 312 having a pressure-releasing hole 313 in the interior. In addition, the water outlet valve 30 is provided with a first water exhausting passage 33 and a second water exhausting passage 34. The first water exhausting passage 33 has one end communicating with the pressure-releasing hole 313 and the other end communicating with the water-releasing hole 311 for the pressure-releasing chamber 312 to release pressure. The second water exhausting passage 34 has one end communicating with the pressure-releasing hole 313 and the other end communicating with the water intake passage 25 of the water intake base 20. The water outlet valve 30 is formed with a main water outlet 35 having an upward opening and communicating with the water outlet passage 26 and the water-releasing hole 311.

The water duct 40 has its lower end connected with the main water outlet 35 and its upper end extending upward and connected with the water supply opening 122 of the shell 10 for guiding cold and hot water to flow out of the water supply opening 122.

The electromagnetic valve 50 to be positioned on the water valve 30 is composed of an induction coil 51 and an iron core 52 able to move in the induction coil 51 to control the first water exhausting passage 33 to open and close.

The induction device 60 is electrically connected with the induction coil 51 of the electromagnetic valve 50, having an electric eye 61 exposed outward at the front end of the head 12 of the shell 10. The photoelectric induction of the electric eye 61 is able to control the electromagnetic valve 50 to operate and control the first water exhausting passage 33 to open and close.

The control device 70 consists of a valve rod 71, a spindle 72 and a revolving button 73. The valve rod 71 is positioned in the main through hole 23 of the water intake base 20 and has two arc-shaped grooves 711, 712 diametrically and respectively bored at a location corresponding to the cold and the hot water passage 21, 22 of the water intake base 20 to control the open extent of the cold and the hot water passage 21, 22 by turning the valve rod 71 for a certain angle. The spindle 72 is pivotally fitted in the valve rod 71 to move axially therein and has an extending portion 721 matching with the size of the subordinate through hole 24 of the water intake base 20. The extending portion 721 of the spindle 72 is bored with an annular groove 722 of a preset width, so that when the spindle 72 is axially shifted to let the annular groove 722 located between the water intake passage 25 and the water outlet passage 26, these two water passages 25, 26 will communicate with each other by means of the subordinate through hole 24, and otherwise these two water passages 25, 26 are blocked from each other. Additionally, the spindle 72 has its outer end fixed with one end of the revolving button 73, which has the other end protruding out of the shell 10 to actuate the valve rod 71 to rotate or actuate the spindle 72 to move back and forth axially.

Thus, when the revolving button 73 actuates the valve rod 71 to rotate, the valve rod 71 can control the flow of cold and hot water in the cold and the hot water passage 21, 22, and when the revolving button 73 actuates the spindle 72 to shift axially, the spindle 72 can control the water faucet to supply water manually or automatically. Furthermore, a recessed groove 713 having a preset width and aligned to the bolt 27 of the water intake base 20 is formed at the upper side of the outer edge of the valve rod 71, letting the valve rod 71 restricted by the bolt 27 to rotate within the recessed groove 713. Besides, the control device 70 is provided with a stop member 74 at a corresponding location of the dovetail-shaped groove 28 of the water base 20, and the spindle has two flanges 723 respectively provided at the opposite sides of the stop member 74, letting the spindle 72 restricted by the stop members 74 in axial shifting.

To control water temperature, only turn around the revolving button 73 to actuate the valve rod 71 to rotate to let its two arc-shaped grooves 711, 712, which are respectively aligned to the cold and the hot water passage 21, 22, opened to various extents for deciding the flow of cold and hot water so as to control the water temperature. To control the water faucet to supply water manually or automatically, only push or pull the revolving button 73 to let the spindle 72 shifts axially.

Figure 4:
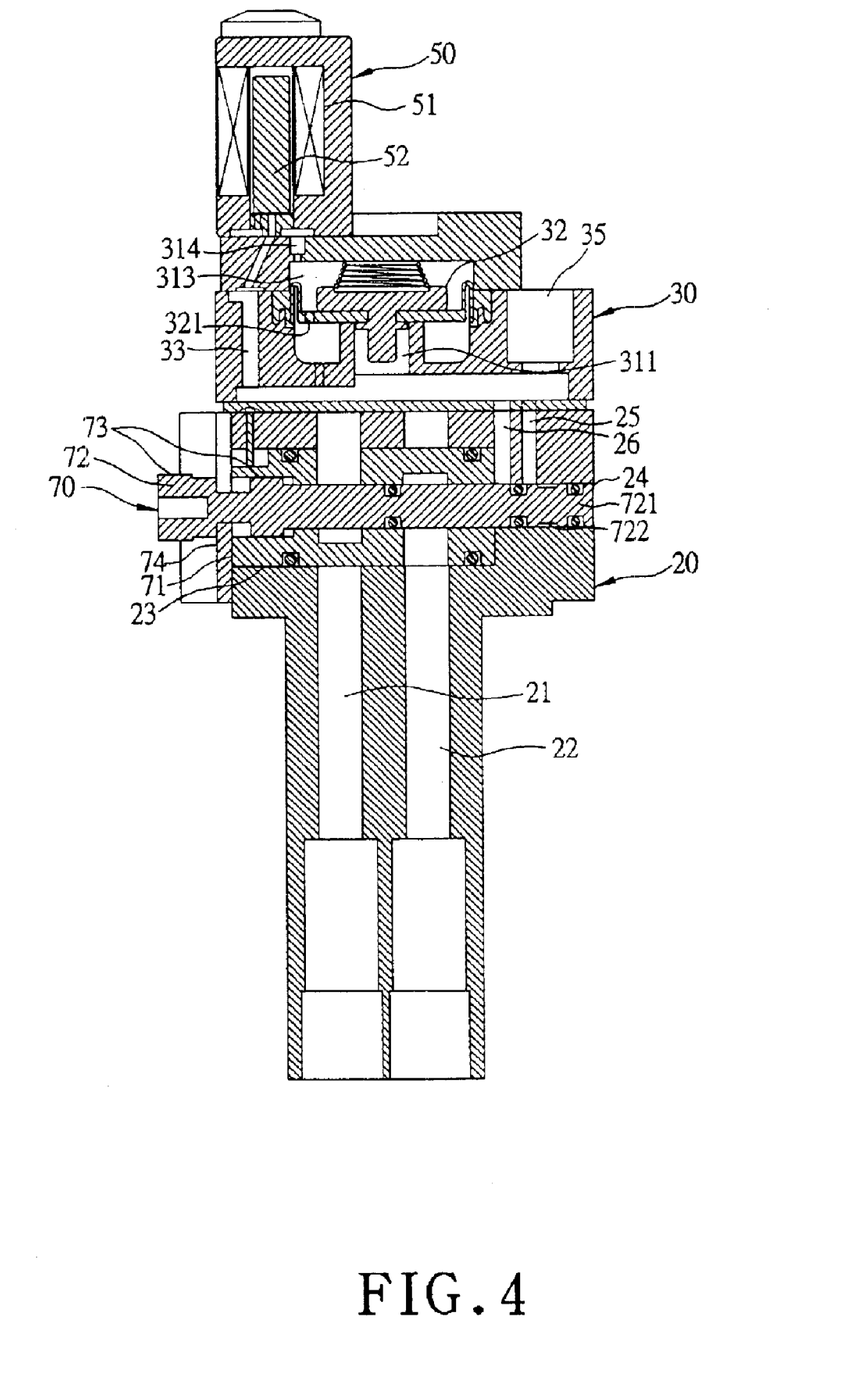
FIG. 4 is a cross-sectional view of the manual-automatic water faucet in the present invention, indicating a water-stopped condition under an automatic mode of supplying water.

To set an automatic mode of supplying water, as shown in FIG. 4, simply push inward the revolving button 73 together with the spindle 72 to let the water intake passage 25 and the water outlet passage 26 blocked by the spindle 72. At this time, cold and hot water cannot flow out of the second water exhausting passage 34, only able to run out of the first water exhausting passage 33, which is controlled by the electromagnetic valve 50 to open and close. Thus, if the induction device 60 is not triggered by the electric eye 61, the first water exhausting passage 33 is in a blocked, and thus water is in a stopped condition.

Figure 5:
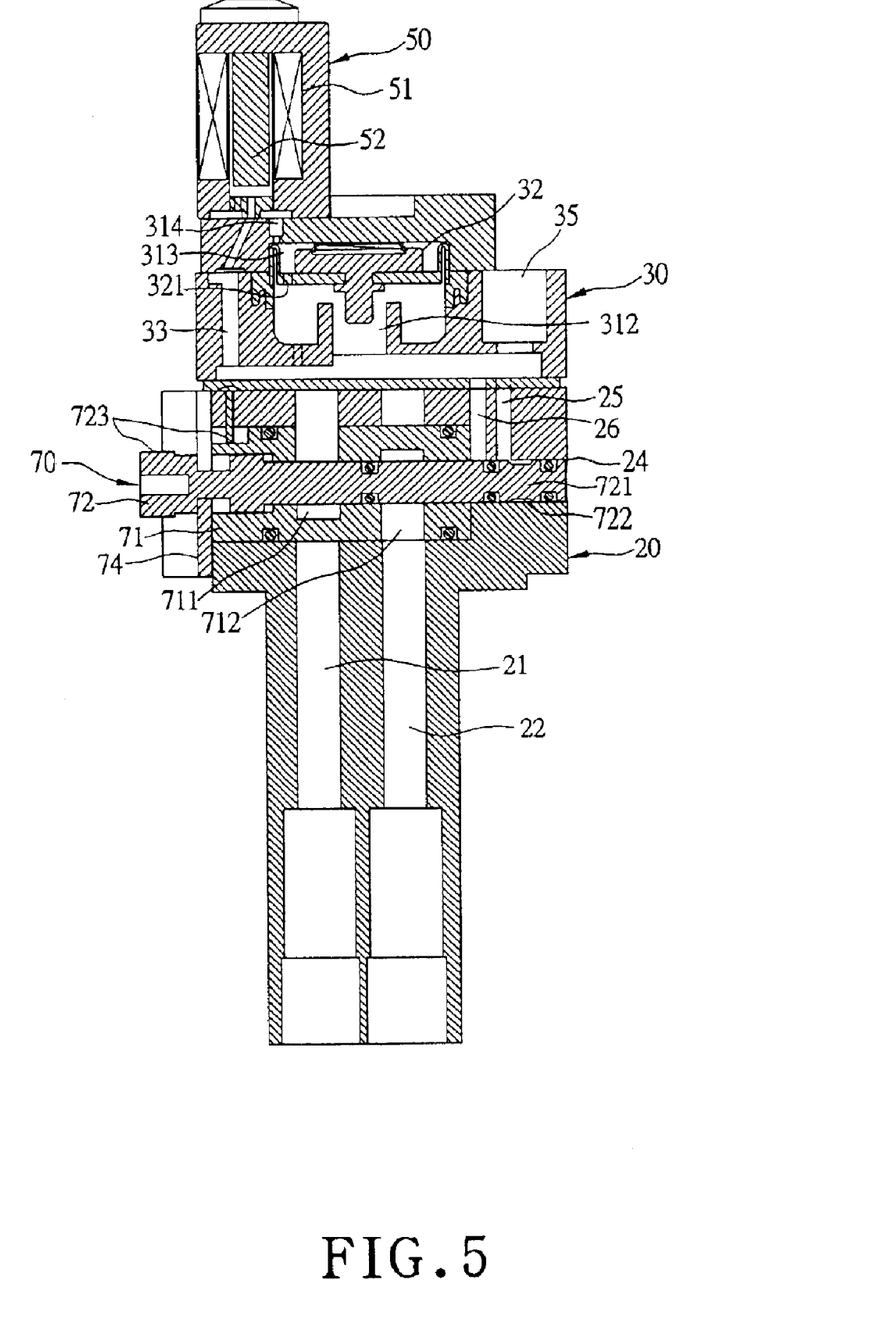
FIG. 5 is a cross-sectional view of the manual-automatic water faucet in the present invention, indicating a water-supplying condition under the automatic mode of supplying water.

When the electromagnetic valve 50 is triggered by the electric eye 61 to let the induction coil 51 produce induced magnetism and move the iron core 52 upward, as shown in FIG. 5, the first water exhausting passage 33 will become communicable to let the pressure releasing chamber 312 release pressure, and the valve plug 32 will be pushed upward by a great quantity of cold and hot water in the valve base 31. At this time, the water-releasing hole 311 of the valve base 31 becomes communicable and a great quantity of cold and hot water flows out of the water supply opening 122 of the faucet through the water-releasing hole 311, the main water outlet 35 and the water duct 40. When the electromagnetic valve 50 is controlled by the induction device 60 and the induction coil 51 no longer produces induced magnetism, the first water exhausting passage 33 will be blocked again by the iron core 52 and the pressure releasing chamber 312 will be filled with water to push the valve plug 32 to move downward to block the water releasing hole 311, having function of supplying water and stopping water automatically.

Figure 6:
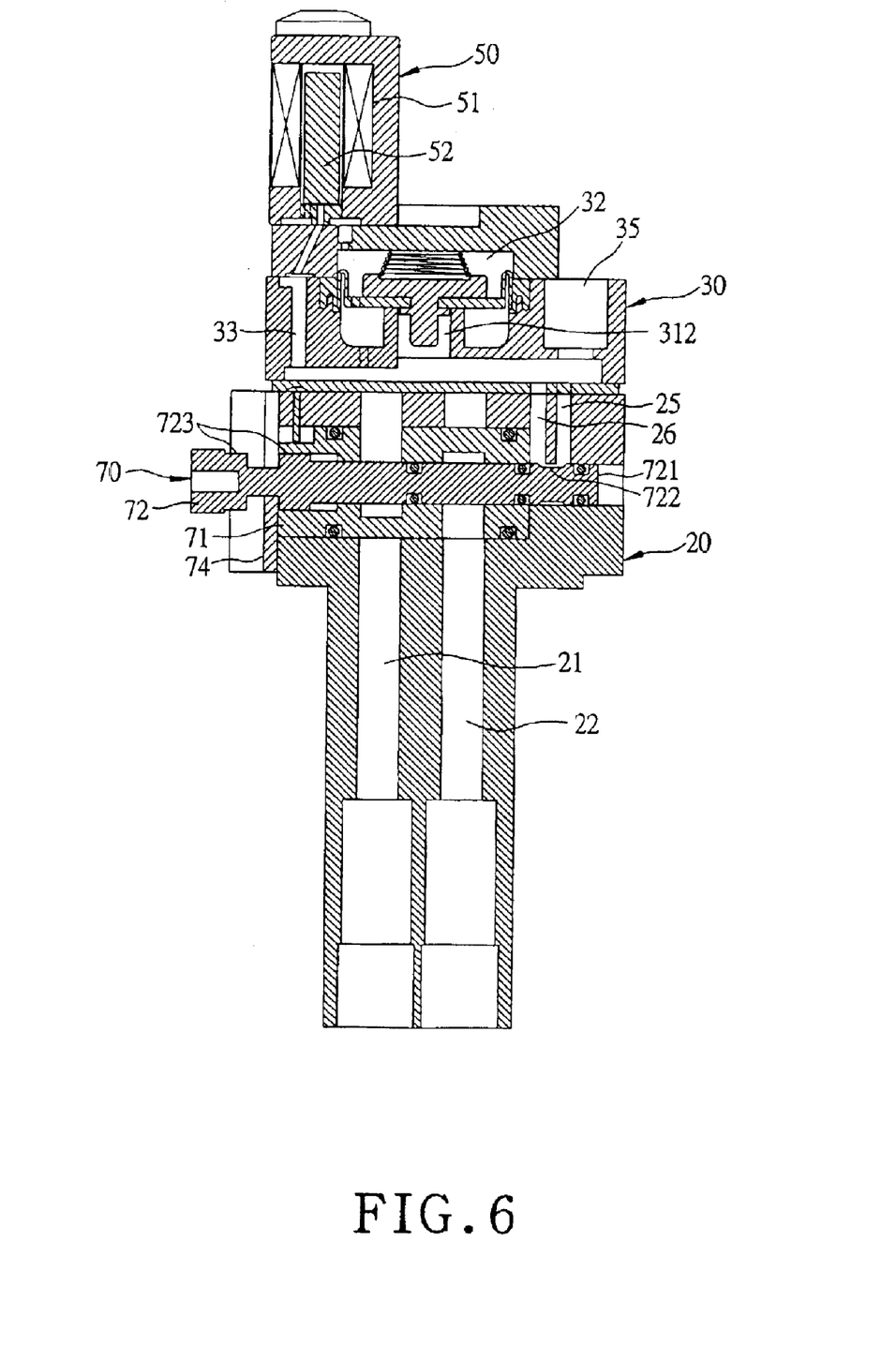
FIG. 6 is cross-sectional view of the manual-automatic water faucet in the present invention, indicating a water-supplying condition under a manual mode of supplying water.

To set the manual mode of supplying water, as shown in FIG. 6, just pull the revolving button 73 outward together with the spindle 72 to let the annular groove 722 of the spindle 72 exactly located between the water intake passage 25 and the water outlet passage 26 to enable these two water passages 25, 26 to communicate with each other. At this time, the water in the pressure releasing chamber 312 releases pressure through the second water exhausting passage 34 and a great quantity of cold and hot water in the valve base 31 pushes the valve plug 32 upward to make the water releasing hole 311 of the valve base 31 communicable and let a great quantity of cold and hot water flow out of the water supply opening 122 of the faucet through the water releasing hole 311, the main water outlet 35 and the water duct 40. Not influenced by the electromagnetic valve 50, the second water exhausting passage 34 can keep communicable all the time so as to let cold and hot water flow out continuously. To stop water from flowing out, only push the revolving button 73 inward to the foresaid position of supplying water automatically.

As can be understood from the above description, this invention has the following advantages.

1. The water faucet cannot only supply cold and hot water, at the same time, but also supply water manually and automatically, convenient in use.

2. The revolving button 73 of the control device 70 can simultaneously control the flow of cold and hot water and the changeover of manual and automatic water supply, simple in handling and simplifying components.

3. The outer handling member is simplified to let the water faucet look simple, tidy and streamlined, having an esthetic appearance and easy in maintenance.

While the preferred embodiment of the invention has been described above, it will be recognized and understood that various modifications may be made therein and the appended claims are intended to cover all such modifications that may fall within the spirit and scope of the invention.

I claim:

1. A manual-automatic water faucet comprising:
    a shell having its lower portion formed with a neck, said neck extending upward and forward to form a head, said neck formed with an opening at the bottom, said head having a water supply opening formed beneath the upper end, said shell receiving the following components:
    a water intake base provided vertically with a cold and a hot water passage, said water intake base bored with a horizontal main through hole communicating with said cold and said hot water passage, said main through hole having its rear side formed with a coaxial subordinate through hole with a comparatively small diameter, said subordinate through hole having a water intake passage and a water outlet passage bored vertically and respectively at a location of unequal diameter of the upper portion:
    a water outlet valve positioned on said water intake base, said water outlet valve composed of a valve base and a valve plug, said valve base communicating with said cold and said hot water passage, said valve base provided with a water releasing hole at the bottom, said water releasing hole blocked by said valve plug normally, said valve base formed with a pressure releasing chamber above said valve plug, said pressure releasing chamber connected with a first water exhausting passage and a second water exhausting passage, said first water exhausting passage having its other end communicating with said water releasing hole, said second water exhausting passage having its other end communicating with said water intake passage of said water intake base, said water outlet valve further formed with a main water outlet, said main water outlet communicating with said water outlet passage of said water intake base and said water releasing hole of said valve base:
    a water duct having one end connected with said main water outlet and the other end extending to said water supply opening of said shell, said water duct guiding cold and hot water to flow out of said water supply opening:
    an electromagnetic valve positioned above said first water exhausting passage of said pressure releasing chamber, said electromagnetic valve controlling said first water exhausting passage to open and close:
    an induction device connected electrically with said electromagnetic valve, said induction device having an electric eye exposed outward at the front end of said head of said shell, said electromagnetic valve controlled by the photoelectric induction of said electric eye to control said first water exhausting passage to open and close: and
    a control device composed of a valve rod, a spindle and a revolving button, said valve rod positioned in said main through hole of said water intake base, said valve rod having its surface provided diametrically with two arc-shaped grooves, said two arc-shaped grooves respectively facing said cold and said hot water passage, said valve rod turned for various angles to control the open extent of said cold and said hot water passage, said spindle pivotally fitted in said valve rod to shift axially therein, said spindle formed with an extending portion matching with the size of said subordinate through hole of said water intake base, said extending portion provided with an annular groove of a preset width, said water intake passage and said water outlet passage of said water intake base communicating with each other when said spindle shifted axially and its said annular groove becoming located between said water intake passage and said water outlet passage, said water intake passage and said water outlet passage unable to communicate with each other under other conditions, said spindle having its outer end fixed with one end of said revolving button, said revolving button having the other end protruding out of said shell, said revolving button able to actuate said valve rod to rotate or actuate said spindle to shift axially, said revolving button actuating said valve rod to rotate to control the flow of cold and hot water respectively in said cold and said hot water passage, said revolving button actuating said spindle to move back and forth axially to control manual or automatic water supply.

2. The manual-automatic water faucet as claimed in claim 1, wherein said valve rod is formed with a recessed groove of a preset width at the upper side near its outer end, and said water intake base is vertically provided with a bolt at the corresponding location of said recessed groove for restricting said valve rod to rotate within said recessed groove.

3. The manual-automatic water faucet as claimed in claim 1, wherein said water intake base is formed with a dove tail-shaped groove at the outer side of said horizontal through hole, said control device is provided with a stop member at a corresponding location of said dove tail-shaped groove, and said spindle has two flanges respectively formed at the opposite sides of said stop member for restricting the axial movement of said spindle.

* * * * *